United States Patent
Tyler

(10) Patent No.: US 11,818,028 B2
(45) Date of Patent: Nov. 14, 2023

(54) NETWORK DIAGNOSTIC SAMPLING IN A DISTRIBUTED COMPUTING ENVIRONMENT

(71) Applicant: DocuSign, Inc., San Francisco, CA (US)

(72) Inventor: Aaron Matthew Tyler, Kirkland, WA (US)

(73) Assignee: DOCUSIGN, INC., San Francisco, CA (US)

( * ) Notice: Subject to any disclaimer, the term of this patent is extended or adjusted under 35 U.S.C. 154(b) by 35 days.

(21) Appl. No.: 17/491,207

(22) Filed: Sep. 30, 2021

(65) Prior Publication Data
US 2023/0097979 A1 Mar. 30, 2023

(51) Int. Cl.
G06F 15/173 (2006.01)
H04L 43/16 (2022.01)
H04L 41/12 (2022.01)
H04L 43/065 (2022.01)
H04L 43/0817 (2022.01)

(52) U.S. Cl.
CPC .............. *H04L 43/16* (2013.01); *H04L 41/12* (2013.01); *H04L 43/065* (2013.01); *H04L 43/0817* (2013.01)

(58) Field of Classification Search
CPC ....... H04L 43/16; H04L 41/12; H04L 43/065; H04L 43/0817
See application file for complete search history.

(56) References Cited

U.S. PATENT DOCUMENTS

| 8,700,669 | B1 | 4/2014 | Glidewell et al. |
| 9,667,569 | B1 | 5/2017 | McHugh et al. |
| 2009/0317087 | A1 | 12/2009 | Bernard et al. |
| 2013/0227352 | A1 | 8/2013 | Kumarasamy et al. |
| 2016/0323163 | A1* | 11/2016 | Abdulnour ............ H04L 12/66 |

(Continued)

OTHER PUBLICATIONS

Microsoft. "Analyzing Software Performance Issues." Justia Patents, Apr. 27, 2011, 25 pages, [Online] [Retrieved Dec. 15, 2021], Retrieved from the Internet <URL:https://patents.justia.cm/patent/8578213>.

(Continued)

*Primary Examiner* — Padma Mundur
(74) *Attorney, Agent, or Firm* — KDW FIRM PLLC

(57) ABSTRACT

A central networking system supports efficient identification and analysis of problems that occur at associated nodes on the network. Using network monitoring rules, the central networking system samples data from a subset of nodes in response to an indication that an error or problem has occurred on the network. If the collected sample data is determined to satisfy certain network conditions, the central networking system proceeds to perform network operations on nodes of the entire network, as appropriate. Thus, the system does not need to collect data from every node in a large network to address potential network threats. The central networking system also defines rules for detecting when a node experiencing a problem violates safety conditions such that it is impossible or inadvisable to pull analytical data from the node. The system performs appropriate remedial actions to address the node problems prior to requesting data for analysis.

17 Claims, 10 Drawing Sheets

(56) References Cited

U.S. PATENT DOCUMENTS

2017/0111209 A1* 4/2017 Ward .................. H04L 12/4633
2019/0238937 A1* 8/2019 Lo .................... H04N 21/44213

OTHER PUBLICATIONS

Netflix Technology Blog. "Netflix FlameScope." The Netflix Tech Blog, Apr. 4, 2018, 8 pages, [Online] [Retrieved Dec. 15, 2021], Retrieved from the Internet <URL:https://netflixtechblog.com/netflix-flamescope-a57ca19d47bb>.
Spier, M. et al. "Vector: Project Status." GitHub.com, Oct. 10, 2020, 5 pages, [Online] [Retrieved Dec. 15, 2021], Retrieved from the Internet <URL:https://github.com/Netflix/vector>.
United States Office Action, U.S. Appl. No. 17/491,241, dated Nov. 14, 2022, 9 pages.

* cited by examiner

NETWORK DIAGNOSTIC SAMPLING IN A DISTRIBUTED COMPUTING ENVIRONMENT

BACKGROUND

Field of Art

This disclosure relates generally to monitoring computer networks and more particularly to safe identification and remediation of network conditions.

Description of Art

Networks of computing machines and devices are increasingly large and complex. It becomes more difficult for organizations to maintain such systems safely and efficiently as they grow and adapt to changing organizational needs. Issues can be identified at nodes of a network using a central system that analyzes data from each of the machines on the network. This process of performing health checks on machines by looking at logs from each machine in turn is inefficient and costly, especially at scale. It takes a large amount of processing power and memory space to store and analyze the data from all the machines on the system. Additionally, responses to perceived network issues on a machine can often cause further problems. If a response to a system issue is executed while a machine is still operating under duress, the machine may lose log data or additional essential functions of the machine may fail, making matters worse for the network as a whole. A way to efficiently identify system problems and to safely diagnose and address the issues without putting further strain on the computer network may be beneficial.

SUMMARY

To efficiently and effectively identify and address network issues, a computer networking system uses a diagnostic sampling method. The central networking system associated with a network of machines receives and stores network monitoring rules for use in monitoring the nodes (i.e., machines) on the network. A network monitoring rule comprises a network condition, a sampling rule, and a type of data to be collected when a set of nodes of the network satisfies the networking condition. The central networking system detects that one or more nodes in the network exhibit the networking condition, for instance by receiving a notification, an alert, or an outside signal related to the networking condition. To efficiently analyze the possible issue with nodes on the network, the central networking system uses the sampling rule defined in the network monitoring rule associated with the network condition to select a subset of the target set of nodes for further analysis. Data specified in the network monitoring rule is collected from the sample subset of nodes and the central networking system performs analyses on the collected sample data. In response to the data from the sample nodes satisfying or exhibiting the network condition, the central networking system can then perform a network operation on some or all of the nodes of the network to best address the issue and return the network to an improved state of operation.

The central networking system is also configured to perform remedial operations on nodes of the network in a way that does not adversely affect the functioning of the suspect node or the network as a whole. In addition to sampling rules, the central networking system stores network monitoring rules associated with diagnostic safety. The diagnostic safety instructions are received by the central networking system from users of the system, such as system administrators. The instructions are stored as network monitoring rules which include a trigger condition, a type of data to be collected when a node of the network satisfies or is suspected of exhibiting the triggering condition, and a safety rule that defines a safety requirement and a remedial action to be taken to address safety concerns of the node. The central networking system detects a target node that satisfies the triggering condition of one of the network monitoring rules and then determines whether the suspect node violates the safety requirement defined in the network monitoring rule. That is, it would be unsafe or problematic to the operation of the node and the network to try to pull log data from the node or to otherwise interact with the node while it continues to violate the safety condition. In response, the central networking system performs the remedial action as defined in the network monitoring rule to address the safety conditions of the node. When the target node is determined to no longer violate the safety conditions, then the central networking system collects data from the target node. The data can be used to diagnose what occurred within the network to cause issues with the node.

The features and advantages described in this summary and the following detailed description are not limiting and are not all-inclusive. Many additional features and advantages will be apparent to one of ordinary skill in the art in view of the drawings, specification, and claims hereof.

BRIEF DESCRIPTION OF THE DRAWINGS

FIG.

The figures use like reference numerals to identify like elements. A letter after a reference numeral, such as "104A,"

Figure 1:
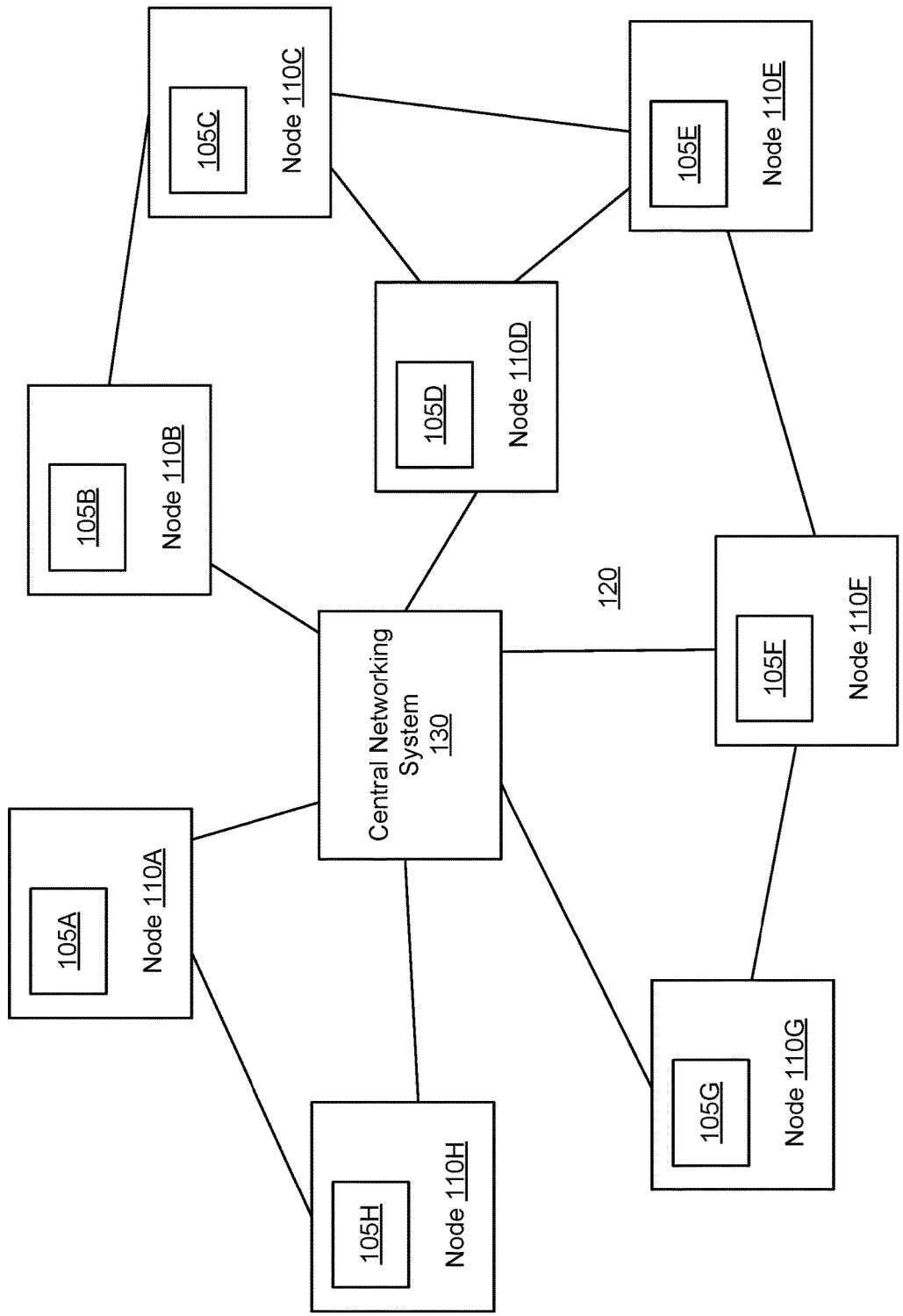
(FIG. 1 is a high-level block diagram of a system environment for a central networking system, in accordance with an example embodiment.

indicates that the text refers specifically to the element having that particular reference numeral. A reference numeral in the text without a following letter, such as "104," refers to any or all of the elements in the figures bearing that reference numeral.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

A central networking system uses network monitoring rules to safely and efficiently locate and address issues on a large network of computing nodes. To efficiently review the state of the network when an adverse event is thought to have occurred, the central networking system can use sampling rules to select a subset of network nodes. Data from the sample subset of nodes is collected and analyzed to determine an appropriate network operation to be taken for some or all of the nodes on the network in response to the adverse event. Thus the network is efficiently and effectively managed without a need to store excess data about every single node on the network each time a problem may have occurred. To ensure that nodes with identified issues can be analyzed and fixed without further negative affects on the network, the central networking system uses network monitoring rules to identify when a node is in an unsafe condition for pulling log data and performs remedial actions to deescalate issues with the node prior to putting more strain on a problem node with more requests for log data.

FIG. (FIG. 1 is a high-level block diagram of a system environment for a central networking system 130, in accordance with an example embodiment. The central networking system 130 facilitates access to centralized data stores and processes and may additionally facilitate interactions among nodes participating in the network. In addition to managing routine network operations, the central networking system 130 monitors the statuses and interactions of nodes on the network and intervenes when issues arise. Some example embodiments may be described in the context of supporting a document management system. However, it will be appreciated that the central networking system 130 can facilitate any suitable number of services in alternative embodiments.

In the example of FIG. 1, the system environment includes the central networking system 130, and nodes 110 (e.g., nodes 110A, 110B, 110C, 110D, 110E, 110F, 110G, and 110H) with agents 105 (e.g., agents 105A, 105B, 105C, 105D, 105E, 105F, 105G, and 105H) running on the respective nodes. The central networking system 130 and nodes 110 are connected via a network 120. For clarity, although eight nodes 110 are shown in FIG. 1, alternate embodiments of the system embodiment can have any number of nodes 110. The functions performed by the various entities of FIG. 1 may vary in different embodiments.

The central networking system 130 comprises one or more computing devices that manage central operations for a networking system. In some embodiments, the central networking system 130 may be one or more servers, a desktop computer, a laptop computer, or any computing device configuration that can manage the operations of the central networking system 130. The central networking system 130 communicates with the system agents 105 running on nodes 110 connected to the network 120. By communicating with the agents 105 and observing interactions on the network 120, the central networking system 130 monitors for issues or triggering conditions that may occur in the system. The central networking system 130 may respond with remedial actions to address detected system issues. Additionally, the central networking system 130 collects safety data and may collect sample data from nodes 110 in response to the detection of triggering conditions.

The nodes 110 are computing devices that communicate with the central networking system 130 over the network 120. A node can be any computing device that can be configured to interact with the central networking system 130. In various example embodiments, a node 110 may be a server, desktop computer, laptop computer, notebook computer, mobile phone, tablet, or internet-of-things device. A node 110 may be a personal computer at which a user accesses and executes a document, and the information about the executed document may then be transmitted and stored at the central networking system 130.

An agent 105 is a software program associated with the central networking system 130 that executes on a node 110. The agent 105 facilitates communication between a node 110 and the central networking system 130. The agent 105 receives instructions from the central networking system 130 and acts as an interface with various modules, processors, tasks, and data stores that may be hosted by the node 110. The agent 105 can also manage access of data logs from the node 110 that may be requested by the central networking system 130. In some embodiments, agents 105 monitor their local nodes 110 for triggering conditions. For example, an agent 105 may receive instructions from the central networking system 130 to detect certain conditions or events that occur locally on the node 110. The agent 105 may report detection of such conditions to the central networking system 130. In some embodiments, the agent 105 responds to specific requests from the central networking system 130 for data. For example, the central networking system 130 may send a request to an agent 105 for the system logs of the node 110 for the previous two hours, or the central networking system 130 may send a request to the agent 105 for the current available processing capacity of the node 110. In various embodiments, the agent 105 may have dedicated memory and processing abilities separate from the node 110 on which it is hosted. The agent 105 may store instructions from the central networking system 130, such as trigger conditions, and may periodically monitor the node 110 for conditions to report to the central networking system 130.

The nodes 110 communicate with the central networking system 130 via the network 120. In FIG. 1, the network 120 is represented by lines connecting nodes 110 and the central networking system 130. However, it will be appreciated that the network 120 can have different connections than those shown in FIG. 1. The network 120 may comprise any combination of local area and wide area networks employing wired or wireless communication links. In some embodiments, all or some of the communication on the network 120 may be encrypted.

Figure 2:
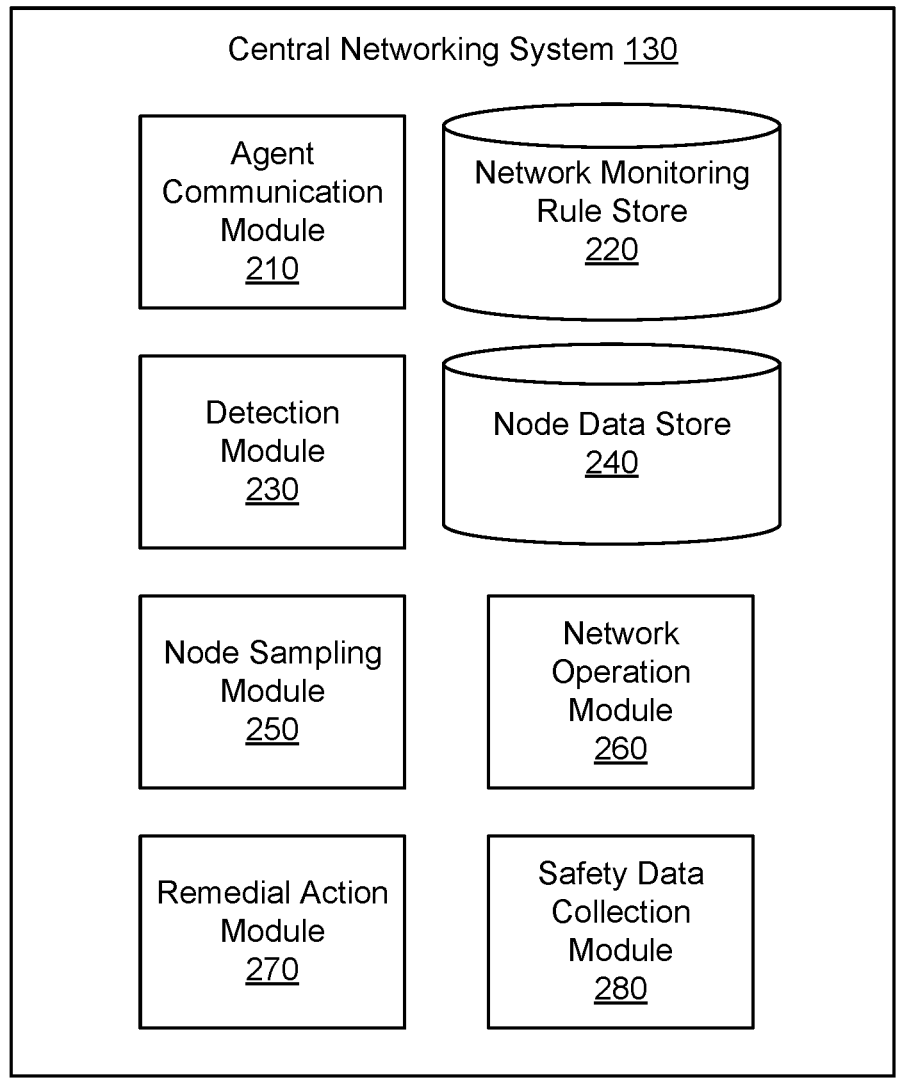
FIG. 2 is a high-level block diagram of a system architecture for the central networking system 130, in accordance with an example embodiment.

FIG. 2 is a high-level block diagram of a system architecture for the central networking system 130, in accordance with an example embodiment. The central networking system 130 includes various modules and data stores to sample activities happening at nodes 110, monitor the nodes 110 on the network 120 for trigger conditions, and perform remedial actions in response to the detection of issues with a node 110 or a particular network 120 condition. The central networking system 130 includes an agent communication module 210, a network monitoring rule store 220, a detection module 230, a node data store 240, a node sampling module 250, a network operation module 260, a remedial action module 270, and a safety data collection module 280. Computer components such as web servers, network interfaces, security functions, load balancers, failover servers, management and network operations consoles, and the like may not be shown so as to not obscure the details of the system architecture. Additionally, the central networking system 130 may contain more, fewer, or different components than those shown in FIG. 2 and the functionality of the components as described herein may be distributed differently from the description herein.

The agent communication module 210 facilitates communication between the central networking system 130 and nodes 110 by interacting with the agents 105 on each of the nodes 110. The agent communication module 210 sends instructions and requests from the central networking system 130 to the agents 105. In some cases, the agent communication module 210 may send individualized requests or instructions to particular nodes 110. In other cases, the agent communication module 210 may transmit broadcast messages or instructions to all or a subset of the agents 105 at the nodes 110 simultaneously.

The network monitoring rule store 220 stores rules for use in monitoring the system of nodes 110. Rules may be configured by administrators or users of the central networking system 130. The rules stored in the network monitoring rule store 220 may include network conditions and trigger conditions that could occur on one or more nodes 110 of the network 120. In various embodiments, certain rules may be active at different times. The rules in the network monitoring rule store 220 are accessed by other modules to obtain instructions for monitoring nodes 110 on the network 120 and to obtain instructions for performing sampling and remedial actions on network nodes 110.

In some cases, a network monitoring rule includes a triggering condition, a type of data to be collected when a node 110 of the network satisfies the triggering condition, and an associated safety rule that defines a safety requirement and a remedial action. An example network monitoring rule may include a trigger condition of a node 110 executing tasks at more than 95% processing capacity for over 5 minutes. The example network monitoring rule may indicate that a log of all of the executing tasks and their processing requirements for the 10 minutes prior to the trigger be collected for analysis. Finally, in the example, the network monitoring rule may be associated with a safety rule that indicates that the log is not to be collected if the node 110 is still executing tasks at over 95% processing capacity and that a remedial action of ending all non-essential tasks should occur prior to the collection of the log data.

In other cases, a network monitoring rule may include a network condition, a sampling rule, and a type of data to be collected when a set of nodes 110 on the network satisfies the networking condition. Example network monitoring rules may include network conditions such as an above-threshold bandwidth used by the set of nodes, an above-threshold set of processing resources used by the set of nodes, one or more security conditions within the set of nodes, one or more identified software components installed within the set of nodes, a power spike detected at a data center, or reports from one or more machines of unusually high network activity. The network monitoring rule may further include a sampling rule that indicates how the nodes 110 of the network will be sampled when the trigger condition is detected. For example, the sampling rule may indicate a percentage of the nodes should be selected, may specify a method of randomly selecting a subset of the set of nodes, or the sampling rule may indicate that a representative node 110 from each of a designated set of groupings of nodes 110 should be sampled. The network monitoring condition also includes a type of data to be collected such as, for example, an activity log, a log of recent memory usage of the node 110, and a log of recent power usage of the system. Notably, a network trigger condition can be a condition occurring on one or more nodes 110 within the network 120, or may be an outside condition. For example, an outside triggering condition could be a notification received that other machines hosted by a same data center as machines with nodes 110 are experiencing power interruption events.

The detection module 230 accesses the network monitoring rule store 220 to obtain network monitoring rules and associated instructions for monitoring the network 120. The detection module 230 monitors the nodes 110 on the network and notifies other modules of the central networking system 130 if it detects a trigger condition as defined by one of the network monitoring rules stored in the network monitoring rule store 220. For example, a triggering condition may be a security condition, a node 110 performance condition, a node 110 property, a node 110 characteristic, or an outdated or missing node 110 software or hardware component. In some embodiments, triggering conditions could also be data audit requests. In some embodiments, the detection module 230 detects target nodes 110 that satisfy a triggering condition or another specific network condition as stored in the network monitoring rule store 220. The detection module 230 may run periodic checks on nodes 110, may run checks each time a new rule is added, may run a check on one or more nodes 110 in response to a command from an administrator, may run randomly timed checks, and may run sampled checks on a subset of the nodes 110 on the network 120.

The node data store 240 stores information about the nodes 110 on the network 120. For example, information stored in the node data store 240 may include processing capabilities, primary functions, current running processes, pending tasks, recently completed tasks, physical location of the node 110, etc. The node data store 240 also stores status and log information about the nodes 110. That is, the node data store 240 may store data that is received in response to the network scans run by the detection module 130. For example, if a network monitoring rule specifies that a log dump of a node 110 should be received in response to the node 110 experiencing a specific triggering condition, then the log dump may be stored in the node data store 240 in association with the node 110. In one embodiment, the node data store 240 also stores sample data from network samples initiated by the node sampling module 250.

The node sampling module 250 determines a subset of nodes to be sampled in response to a detection by the detection module 230 that one or more nodes 110 in a target set of nodes 110 has satisfied some networking condition. For example, if the detection module 230 detects that a triggering condition has occurred, or otherwise receives a notification that a some network condition has occurred, and if a sampling rule associated with that triggering network condition is stored in the network monitoring rule store 220, then the node sampling module 250 will proceed to sample the nodes 110 on the network 120 according to the sampling rule. An example of a sampling rule is that 10% of the nodes 110 in the network are randomly selected. In some embodiments, selecting a subset of the target set of nodes based on the sampling rule comprises selecting a threshold number of least utilized nodes, a threshold number of nodes using a lowest bandwidth, and/or a threshold number of nodes using a lowest amount of power. The node sampling module 250 collects data from the sampled nodes 110 or oversees collection of such data by another process. In some embodiments, node sampling may include sending instructions and data requests to agents 105 at selected nodes via the agent communication module 210. Any data about the sampled nodes 110 received during the sampling process may be stored in the network monitoring rule store 220. In alternate embodiments, a separate data store may be maintained to store the sample data.

The network operation module 260 performs and/or oversees performance of certain network operations that occur in response to a network condition or other network monitoring rule being satisfied by the sampled subset of nodes 110. That is, the central networking system 130 performs a network operation on the target set of nodes 110 if a sampled subset of the target set of nodes 110 satisfy the sampling rule. In some embodiments, the network operation module 260 performs the network operation on the sampled subset of the target set of nodes 10 and then performs the network operation on other nodes 110 outside the sample subset of nodes 110 only if the nodes 110 on the network continue to satisfy or otherwise exhibit the networking condition after the network operation has been applied to the sampled subset of nodes 110. In some cases, a network operation may be selected by the network operation module 260 or by an administrator interacting with the central networking system 130 such that when the network operation is performed the target set of nodes will no longer satisfy the networking condition (i.e., fixing or addressing the network issue).

If a network operation cannot be performed or executed directly by the network operation module 260, then the network operation module 260 may interact with other modules of the central networking system 130 and with agents 105 on nodes 110 of the network 120 to execute the network operation. A network operation may be any action taken on the network 120 or taken with respect to a node 110. Examples of network operations include redirecting network traffic to different nodes 110, ending tasks, starting new tasks, power cycling a node 110 machine, executing a script on one or more nodes 110, and bringing new nodes 110 onto the network 120 for load balancing or other purposes. In some embodiments, instructions and other resources associated with performing network operations may be stored at the network monitoring rule store 220. In alternate embodiments, a separate data store may be maintained for storing operation instructions associated with operations to be performed on the network 120. In some embodiments, instructions for network operations performed by the network operation module 260 may be obtained from other sources than the network monitoring rule store 220. For example, a network administrator may instruct the network operation module 260 to execute an operation.

The remedial action module 270 performs and/or oversees performance of remedial actions to address safety concerns on the network 120. The remedial action module 270 responds to a determination that one or more nodes 110 violate a safety requirement. In one embodiment, a safety requirement includes a temperature threshold such that a target node violates the safety requirement if a processing component of the target node 110 exceeds the temperature threshold. In one embodiment, a safety requirement includes a processing load threshold and a target node violates the safety requirement if a processing component utilization of the target node 110 exceeds the specified processing load threshold. In still another example embodiment, the safety requirement may include a bandwidth threshold, such that the target node 110 violates the safety requirement if one or both of an input bandwidth and an output bandwidth of the node 110 exceeds a bandwidth threshold. The aim of the remedial action module 270 is to ensure that any safety concerns are addressed and the network 120 is returned to a stable condition before nodes 110 on the network 120 are instructed to expend extra resources obtaining log data and generating reports. Examples of remedial actions that may be performed by the remedial action module 270 include throttling traffic to the target node 110, reducing a computational load of the target node 110, implementing one or more firewalls between the target node 110 and one or more other nodes 110 in the network, sandboxing the target node 110, and updating one or more software components of the target node 110. As an example, a network monitoring rule stored in the network monitoring rule store 220 may include a triggering condition of a node 110 overheating, an indication that a log of recently executed tasks and temperatures of the node 110 should be collected in response to the triggering condition, and a safety rule and remedial action indicating that the logs cannot be requested until the node temperature has returned to a certain safe range, where the remedial action may be to end tasks running on the overheating node 110 until it cools down. In this example, the remedial action module 270 performs the remedial action of interfacing with the agent 105 at an overheating node 110 to instruct the node 110 to cancel unresponsive or otherwise resource-intensive tasks according the safety rule and the remedial action instructions until the node 110 is no longer overheating. Remedial actions managed by the remedial action module 270 may vary according to various embodiments, and according to the remediation instructions stored in the network monitoring rule store 220. Some example remedial actions include rerouting network traffic to alternate nodes 110, ending tasks, starting new tasks, power cycling the node 110, executing a script on a node 110, bringing new nodes 110 onto the network 120 for load balancing or other purposes. In some embodiments, the remedial action module 270 and the network operation module 260 may be the same module. That is, the two modules can respond with similar network operation actions to trigger conditions and safety rules.

The safety data collection module 280 manages collection of data from a node or set of nodes that satisfied a condition associated with a network monitoring rule. The safety data collection module 280 collects the type of data that is indicated by a network monitoring rule. That is, some network monitoring rules stored in the network monitoring rule store 220 include a type of data to be collected by the safety data collection module 280 when a node 110 of the network 120 satisfies a triggering condition of the rule. Prior to collecting data from the one or more nodes 110, the safety data collection module 280 communicates with the remedial action module 270 to determine whether the target node 110 no longer violates the safety requirement. If a target node 110 still violates a safety requirement, then the safety data collection module 280 may wait to receive an indication from the remedial action module 270 that the safety trigger condition has been addressed. The safety data collection module 280 collects log data and/or other information from the nodes. Examples of other data types that may be collected from nodes 110 include timestamps, text files, documents, audio files, and sensor readings from components associated with a node 110. In one embodiment, this collection involves interaction with the agents 105 on the specific nodes 110 via the agent communication module 210. The log data may include data from some amount of time prior to and/or during the occurrence of the triggering event. This data can be used, for example by network administrators, to diagnose what happened to cause a problem with the node 110 on the network 120. In one embodiment, the collected data may be stored in the node data store 240. In some cases, the collected data may be stored in a separate data store. In some embodiments, the node sampling module 250 and the safety data collection module 280 may be the same or interrelated modules in that they work with other modules of the central networking system 130 to manage collection of data from nodes 110.

Figure 3:
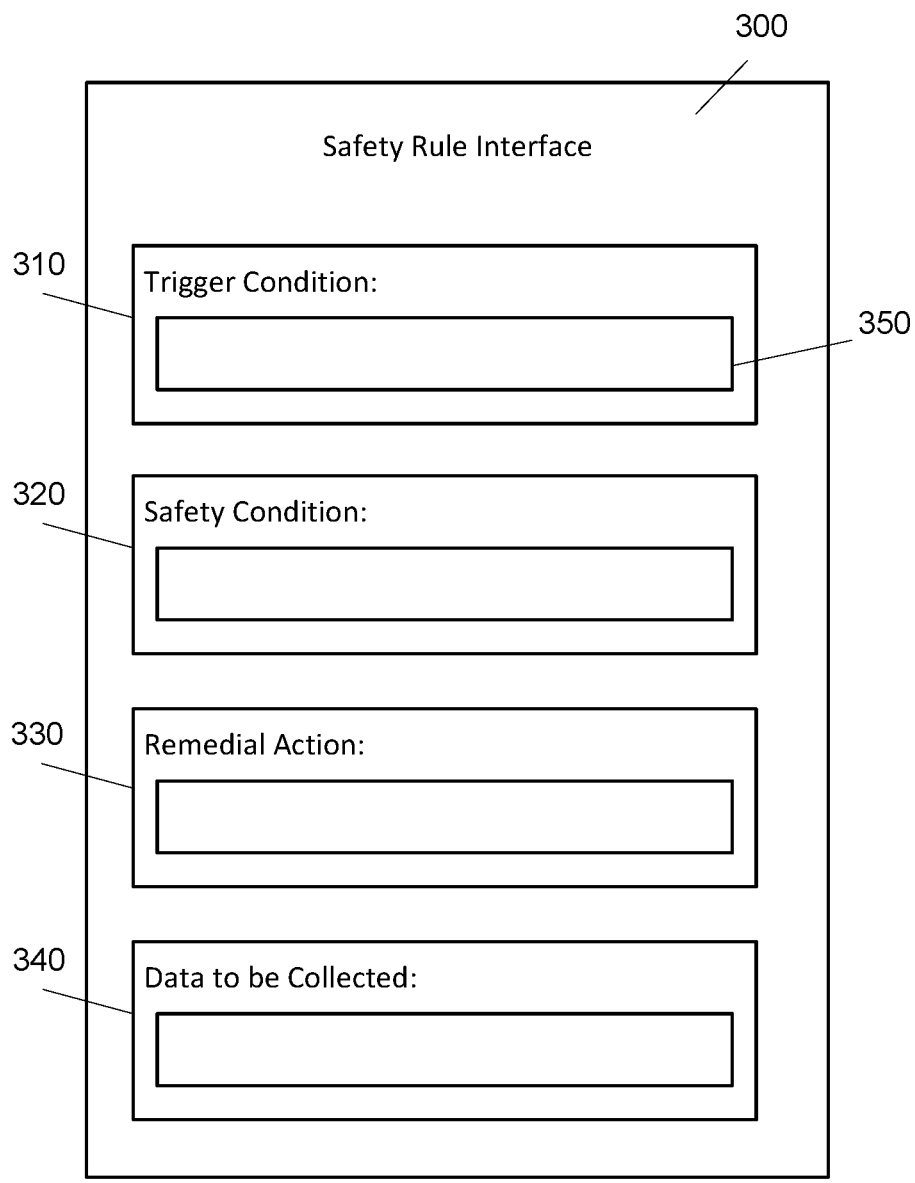
FIG. 3 is an example interface for a user to use to input a network monitoring rule, in accordance with an example embodiment.

FIG. 3 is an example interface for a user to use to input a network monitoring rule, in accordance with an example embodiment. The example interface 300 includes a trigger condition input widget 310, a safety condition input widget 320, a remedial action input widget 330, and a data collection input widget 340. The input widgets shown in FIG. 3 include input fields 350. FIG. 3 includes input widgets with text fields (e.g., for inputting text labels, identification tags, code, regular expressions, or another input that can be used by the central networking system 130 to specify a condition of one or more nodes 110 on the network 120. However, alternate input formats such as radio buttons, drop-down menus, scroll wheels, and the like may be used in various embodiments. The safety rule interface 300 defines a network monitoring rule for the central networking system 130. The trigger condition input widget 310 accepts input defining a triggering condition associated with the network monitoring rule. Examples of trigger conditions that may be specified in the trigger condition input widget 310 include a maximum bandwidth percentage of data being received at a node 110, a temperature of the node 110 machine, an error code occurring on the node 110, a response time of the node 110, and a percentage of total processing capacity of the node 110 being in use. Examples of trigger safety conditions that may be specified in the safety condition input widget 320 include a maximum use of processing capacity that can be taken up before data is collected, a maximum temperature the node 110 machine at the time data is collected, an amount or identification of network interactions with other nodes 110 that can be occurring at one time, and a number of processes executing on the node 110. Examples of remedial actions that may be specified in the remedial action input widget 330 include rerouting network traffic to alternate nodes 110, ending tasks, starting new tasks, power cycling the node 110, executing a script on a node 110, bringing new nodes 110 onto the network 120 for load balancing or other purposes. Examples of types of data that may be specified in the data collection widget 340 include logs of tasks, interactions with other nodes 110, history of node temperature, a time range of data collection, and other data type indications.

Figure 4A:
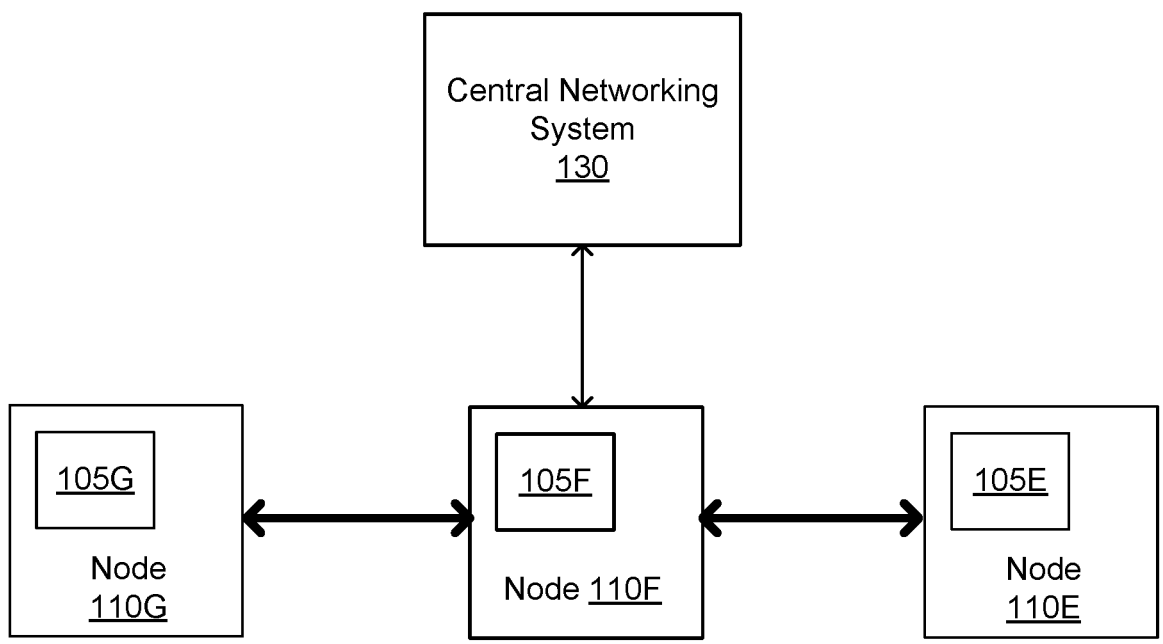
FIG. 4A illustrates an example scenario in which a network monitoring rule including a safety requirement may be triggered, in accordance with an embodiment.

FIG. 4A illustrates an example scenario in which a network monitoring rule including a safety requirement may be triggered, in accordance with an embodiment. FIG. 4A shows one node 110F on the network 120. The node 110F is communicatively connected to the central networking system 130 via the network 120. The node 110F is also shown as being communicatively connected on either side to node 110G and node 110E. In addition to the example of nodes 110G and 110E, a safety requirement could be triggered with respect t a node 110 connecting or interacting with other nodes 110 or with outside machines connected via the network 120. In the example of FIG. 4A, bolded arrows represent higher than usual bandwidth of network traffic interacting with the node 110F. In the example of FIG. 4A, the network monitoring rule store 220 has a network monitoring rule that includes a triggering condition of bandwidth for the node 110F exceeding some specified threshold value. The detection module 230 identifies the node 110F as satisfying the triggering condition, and notifies the remedial action module 270 and the safety data collection module 280 that the triggering condition has occurred for node 110F.

Figure 4B:
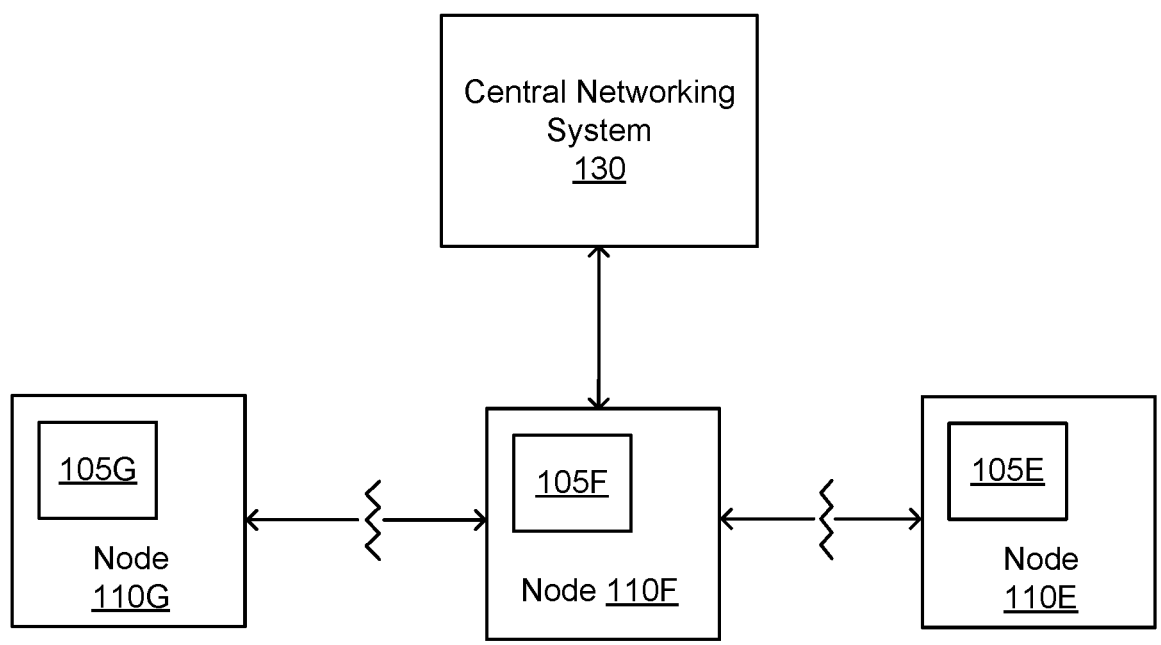
FIG. 4B illustrates an example scenario in which the central networking system has responded to the occurrence of a triggering condition in a network monitoring rule with a remedial action, in accordance with an embodiment.

FIG. 4B illustrates an example scenario in which the central networking system has responded to the occurrence of a triggering condition in a network monitoring rule with a remedial action, in accordance with an embodiment. In FIG. 4B, the detection module 230 has detected that the bandwidth of network traffic in and out of the node 110F exceeds a threshold value, as specified in a triggering condition of the network monitoring rule. In response to the notification from the detection module 230, the remedial action module 270 determines whether the node 110F violates a safety requirement specified in the network monitoring rule. For this example, the safety requirement may be that more than 95% of the available bandwidth for the node 110F is being used. Note that the safety requirement and the triggering condition do not have to be the same (e.g., a trigger could be a temperature of a node and the safety requirement could be that the node is not running any non-essential tasks). In the example, the node 110F does satisfy the safety rule, so the remedial action module 270 initiates the remedial actions identified in the network monitoring rule. The remedial action in this case is to reroute network traffic away from the node 110F, as depicted by the zig-zag lines breaking the network connection lines between node 110F and nodes 110G and 110E, shown in FIG. 4B. Once the remedial action has been executed, and in response to a determination from the remedial action module 270 that the node 110F no longer violates the safety requirement (i.e., the node now has below 95% of it's available bandwidth in use), the safety data collection module 280 interacts with the agent 105F of the node 110F to obtain log data about the node 110F activities, as specified by the network monitoring rule. In some cases, once the safety data collection module 280 has collected the data, certain aspects of a remedial action may be removed by the remedial action module 270. For example, the remedial action module 270 may reopen network communications of the node 110F with other nodes 110 on the network 120. Additionally, in some embodiments, when a remedial action is performed, it can involve actions taken on other nodes 110 (e.g., network traffic may be routed around the target node 110, or processing tasks may be removed from the queue of the target node 110 and added to queues of surrounding nodes 110).

Figure 5:
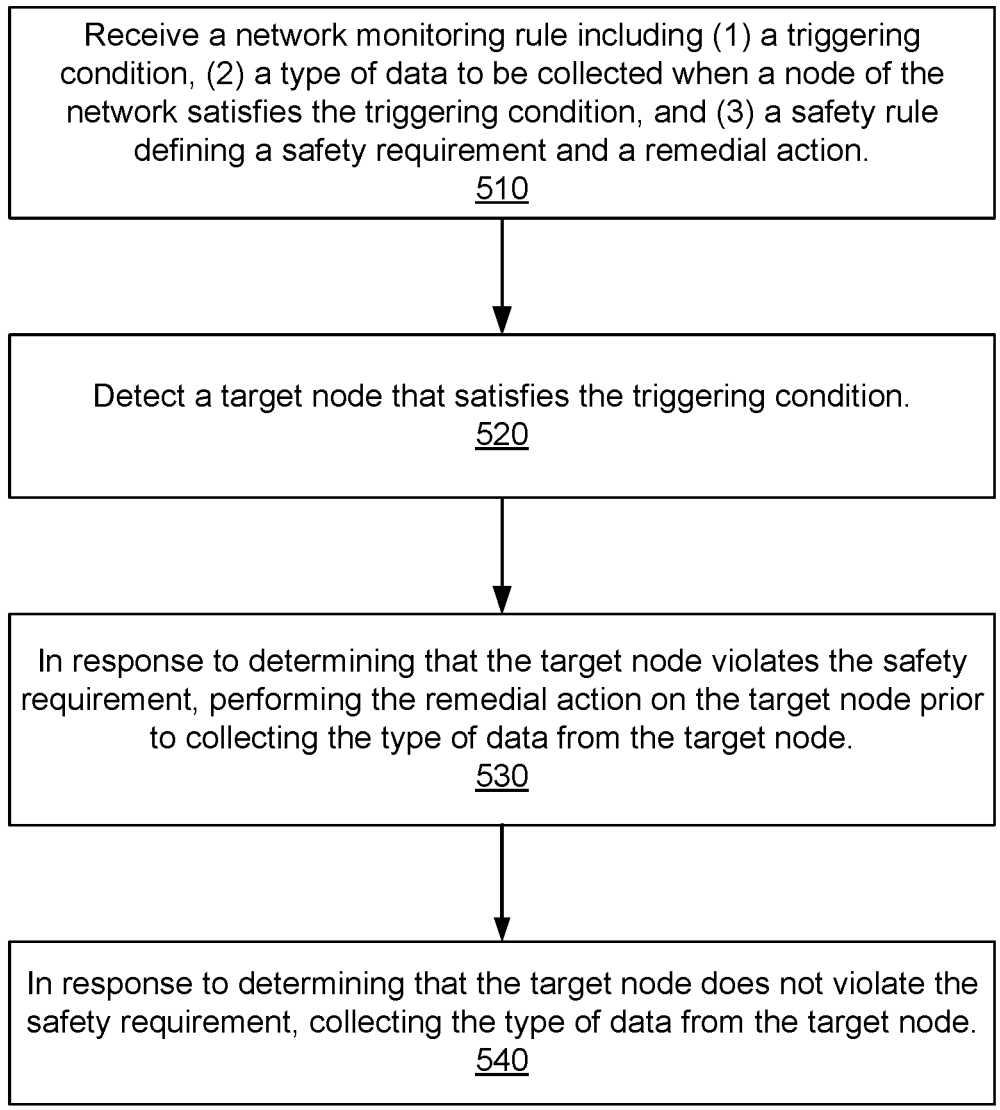
FIG. 5 is a flow chart illustrating a method of performing safety checks and remedial actions on a network, in accordance with an example embodiment.

FIG. 5 is a flow chart illustrating a method of performing safety checks and remedial actions on a network, in accordance with an example embodiment. The central networking system 130 of a network 120 receives 510 a network monitoring rule including (1) a triggering condition, (2) a type of data to be collected when a node of the network satisfies the triggering condition, and (3) a safety rule that defines a safety requirement and a remedial action. The detection module 230 detects 520 a target node 110 that satisfies the triggering condition. In response to the detection, the remedial action module 270 determines that the target node 110 violates the safety requirement, the remedial action module 270 performs 530 the remedial action on the target node 110 prior to the collection, by the safety data collection module 280 of the type of data specified in the network monitoring rule from the target node 110. In response to determining that the target node does not or no longer violates the safety requirement, the safety data collection module 280 collects 540 the specified type of data from the target node.

Figure 6:
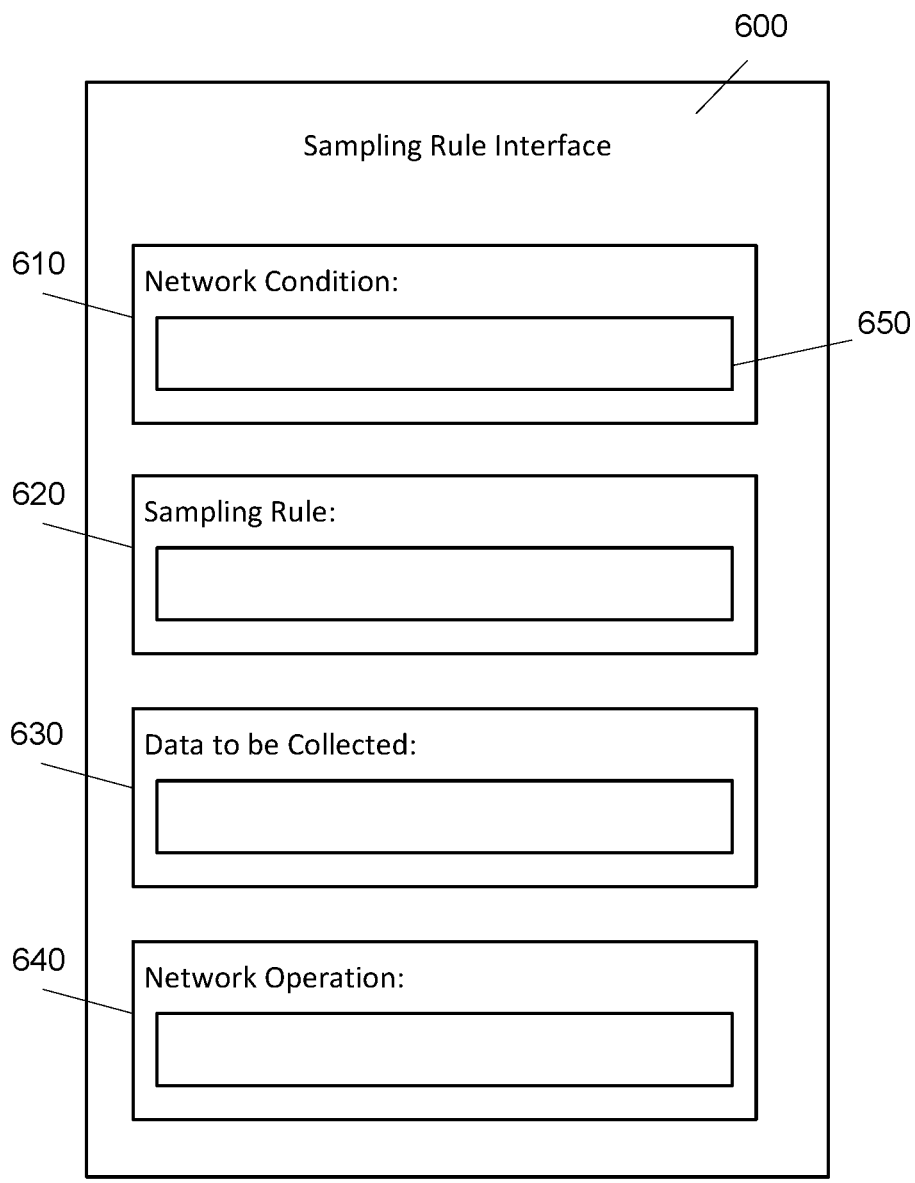
FIG. 6 is an example interface for a user to use to input a network monitoring rule for sampling the network, in accordance with an example embodiment.

FIG. 6 is an example interface for a user to use to input a network monitoring rule for sampling the network, in accordance with an example embodiment. The example interface 600 includes a network condition input widget 610, a sampling rule input widget 620, a data collection input widget 630, and a network operation input widget 640. The input widgets shown in FIG. 6 include input fields 650. FIG. 6 includes input widgets with text fields (e.g., for inputting text labels, identification tags, code, regular expressions, or another input that can be used by the central networking system 130 to specify a condition of one or more nodes 110 on the network 120. However, alternate input formats such as radio buttons, drop-down menus, scroll wheels, and the like may be used in various embodiments. The sampling rule interface 600 defines a network monitoring rule for the central networking system 130 to use for determining when and how to sample the network 120.

The network condition input widget 610 accepts input defining a network condition associated with the network monitoring rule. Examples of network conditions that may be specified in the network condition input widget 610 include a maximum bandwidth percentage of data being received at a node 110, a temperature of the node 110 machine, an error code occurring on the node 110, a response time of the node 110, and a percentage of total processing capacity of the node 110 being in use. Examples of sampling rules that may be specified in the sampling rule input widget 620 include a percentage of the nodes 110 that should be sampled, identification of specific nodes to sample, a random sampling algorithm, and other instructions for how nodes 110 can be selected from among a set of nodes 110 on the network 120. Sampling, as defined in the sampling rule, can be random, or it can be random subject to certain constraints (e.g., ensuring that a threshold number of each of a plurality of types of nodes are selected, ensuring that at least one node in each of a plurality of subnetworks is selected, etc.). Additionally, the sampling rule may include instructions to sample from system that have been sampled the least recently, systems that have been sampled most frequently, systems that have recorded errors in the past, and the like. Examples of data types that may be specified by the data collection input widget 630 may include logs of tasks, interactions with other nodes 110, history of node temperature, a time range of data collection, and other data type indications. Examples of network operations that can be specified in the network operation input widget 640 include any operations that can be prompted by the central networking system 130 to be executed on the nodes 110 of the network 120, such as rerouting network traffic to alternate nodes 110, ending tasks, starting new tasks, power cycling the node 110, executing a script on a node 110, bringing new nodes 110 onto the network 120 for load balancing or other purposes.

Figure 7A:
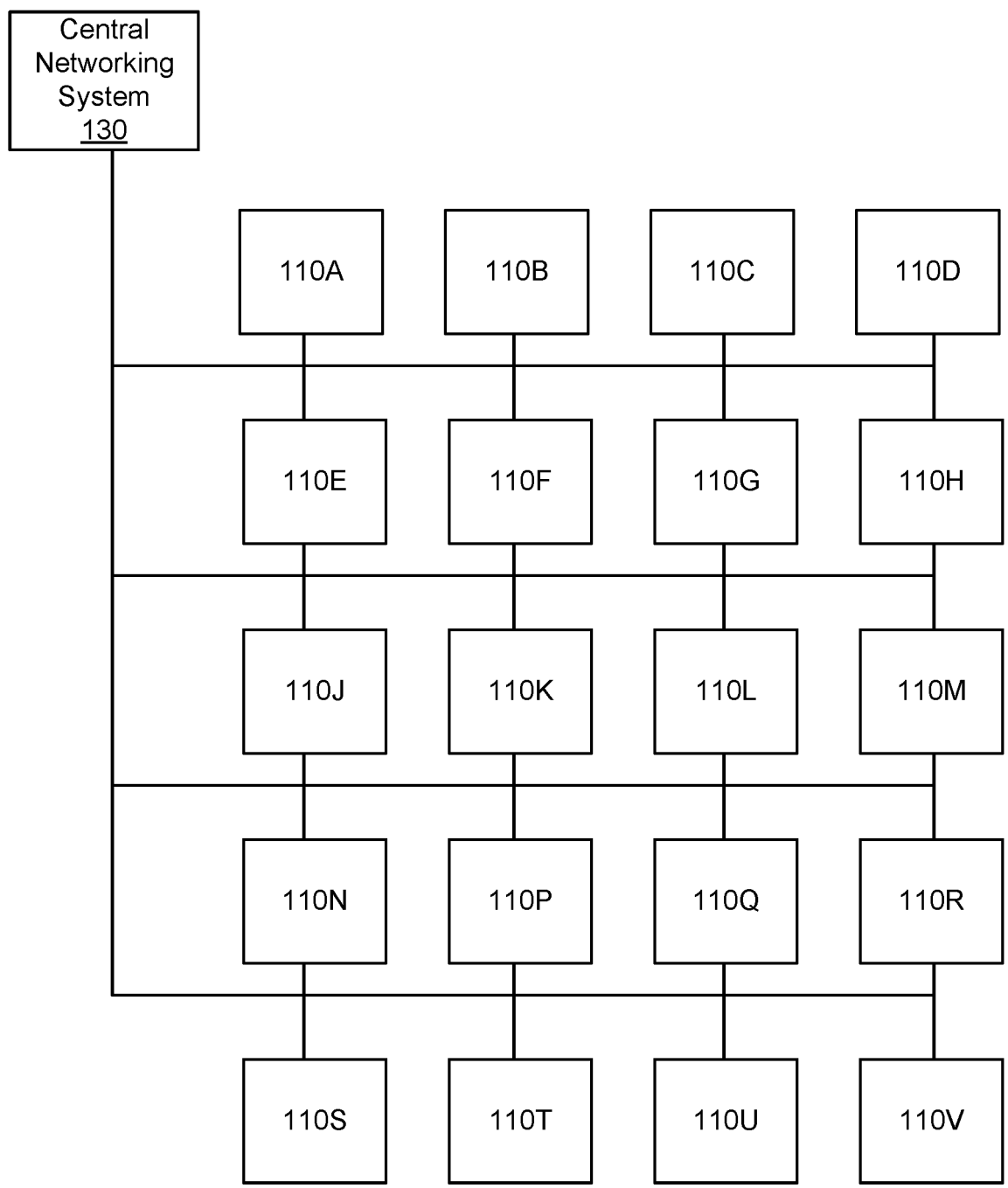
FIG. 7A is a high-level block diagram illustrating a network of nodes in communication with the central networking system, in accordance with one example embodiment.

FIG. 7A is a high-level block diagram illustrating a network of nodes in communication with the central networking system, in accordance with one example embodiment. For the sake of illustration, the example network 120 of FIG. 7A shows twenty nodes 110 (i.e., nodes 110A, 110B, 110C, 110D, 110E, 110F, 110G, 110H, 110J, 110K, 110L, 110M, 110N, 110P, 110Q, 110R, 110S, 110T, 110U, and 110V). In the example of FIG. 7A, the detection module 230 of the central networking system 130 detects or otherwise receives an indication of a networking condition of a stored network monitoring rule being satisfied by some node 110 on the network 120.

Figure 7B:
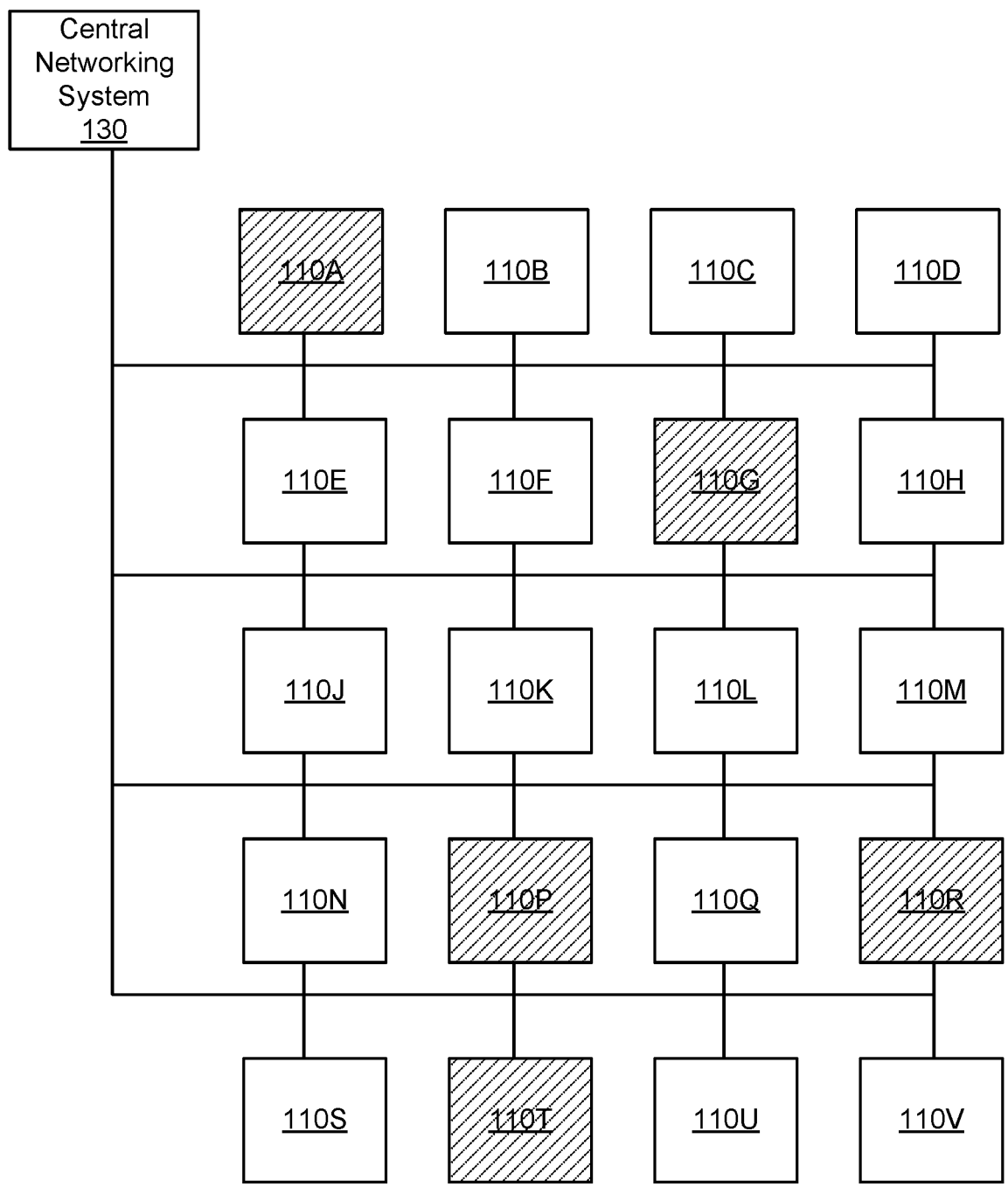
FIG. 7B is a high-level block diagram illustrating a sampling of a network of nodes in communication with the central networking system, in accordance with one example embodiment.

FIG. 7B is a high-level block diagram illustrating a sampling of a network of nodes in communication with the central networking system, in accordance with one example embodiment. When the detection module 230 determines that one or more nodes 110 in the target set of nodes 110 (i.e., the nodes 110 on the network 120 that are associated with the central networking system 130) satisfy the networking condition, as in FIG. 7A, then the node sampling module 250 selects a subset of the nodes 110 for sampling. The subset of nodes to be sampled is chosen according to the sampling rule specified as a part of the network monitoring rule that is associated with the network condition. In the example of FIG. 7B, the sampling rule may be that a quarter of the target nodes should be selected at random as a sample. In FIG. 7B, the randomly sampled nodes 110 (i.e., nodes 110A, 110G, 110P, 110R, and 110T) are shown as having a hatching pattern. The node sampling module 250 obtains data from the sampled subset of the target nodes 110. The data retrieved by the sampling module 250 is the type of data to be collected that is specified by the network monitoring rule, as input to the data collection input widget 630. In response to the data from the sampled nodes 110 satisfying the network condition specified in the network monitoring rule, the network operation from the network monitoring rule is executed with respect to all of the nodes 110 in the target set (not only the sampled nodes). In some embodiments, if the network condition is not observed in the sampled nodes 110, then the node sampling module 250 may sample a new set of nodes 110 to repeat the data analysis on another subset of the nodes.

Figure 8:
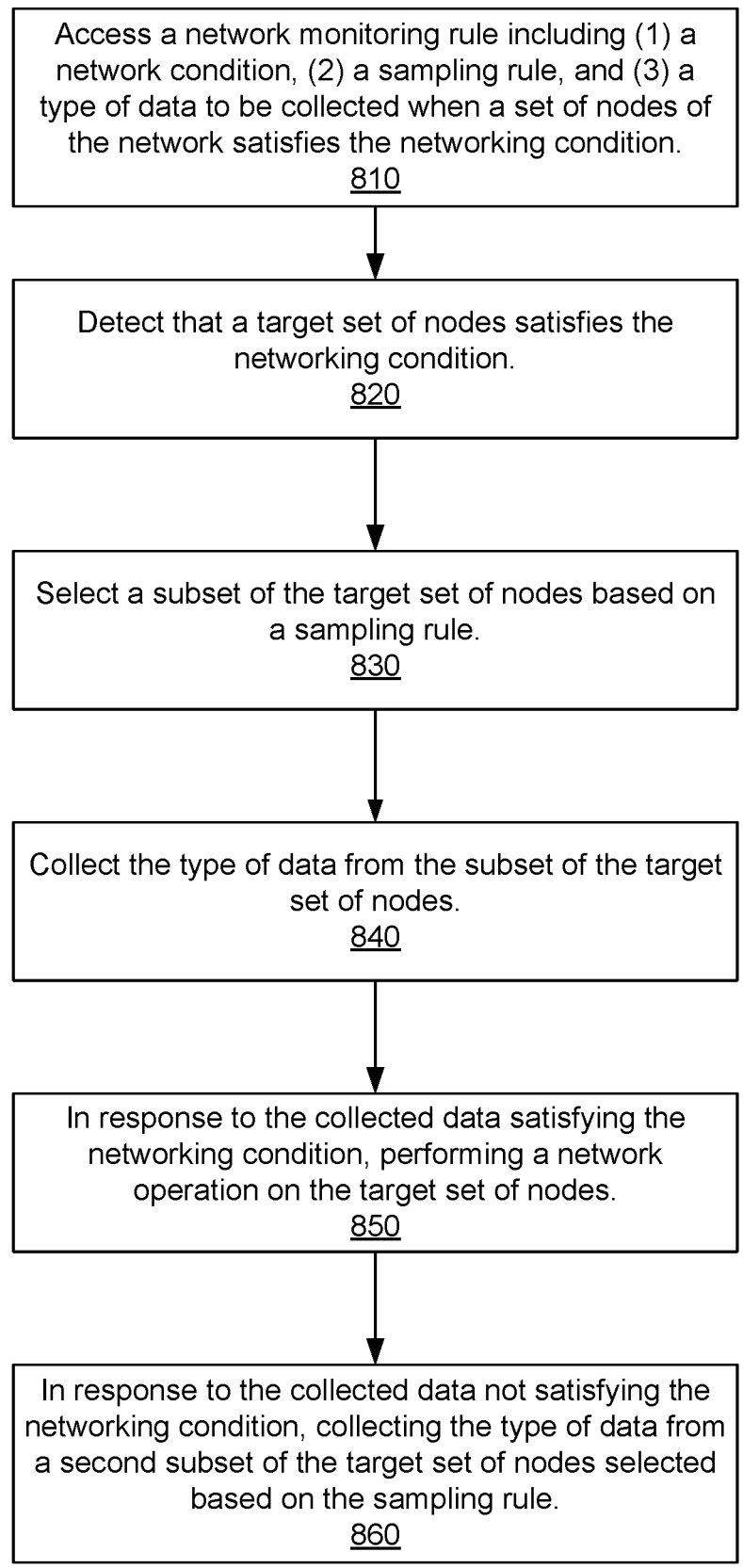
FIG. 8 is a flow chart illustrating a method of performing diagnostic sampling on nodes of a network, in accordance with an example embodiment.

FIG. 8 is a flow chart illustrating a method of performing diagnostic sampling on nodes of a network, in accordance with an example embodiment. The central networking system 130 accesses 810 a network monitoring rule stored at the network monitoring rule store 220. The network monitoring rule may include (1) a network condition, (2) a sampling rule, and (3) a type of data to be collected when a set of nodes of the network satisfies the networking condition 810. The detection module 230 detects 820 that a target set of nodes satisfies the networking condition. The node sampling module 250 selects 830 a subset of the target set of nodes 110 based on a sampling rule, for example, as defined in the network monitoring rule. After determining a subset of the set of target nodes 110 for sampling, the node sampling module 250 collects 840 the type of data that is specified in the network monitoring rule from the determined subset of the target set of nodes 110. In response to the collected data from the sample subset of nodes 110 satisfying the networking condition specified in the network monitoring rule, the network operation module 260 performs 850 a network operation on the target set of nodes 110. In some embodiments, the network operation is also specified in the network monitoring rule. In response to the collected data from the sample subset of nodes 110 not satisfying the networking condition, the node sampling module 250 may sample a second subset of the target set of nodes 110 and collect 860 the specified type of data from the second sampled subset of nodes 110.

In one embodiment, the node sampling module 250 may sample a first subset of nodes 110 and analyze data collected from the first set of nodes 110. Based on the analysis of the collected data, the node sampling module 250 may identify one or more of the sampled nodes that trigger the networking condition. The sampling module 250 can then sample a second subset of nodes 110, the second subset of nodes being similar to the nodes 110 from the first sample that were identified as triggering the network condition. For example, the node sampling module 250 may sample nodes 110 having a similar configuration, nodes 110 with similar hardware or software components, nodes 110 of the same type as the identified nodes 110, nodes 110 within the same sub-network as the identified nodes 110, and the like. In this embodiment, the node sampling module 250 can be used to further search for and identify nodes 110 of the network 120 that may also have issues that could affect the network 120 without a need to access every node 120 on the network.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing, by central networking system of a network, a network monitoring rule comprising 1) a networking condition, 2) a sampling rule, and 3) a type of data to be collected when a node of a target set of nodes of the network satisfies the networking condition;
   receiving, by the central networking system, a notification from an agent executing on the node of the target set of nodes;
   detecting, by the central networking system, that the node of the target set of nodes satisfies the networking condition based on the notification;
   selecting, by the central networking system, a subset of the target set of nodes based on the sampling rule in response to the detection;
   collecting, by the central networking system, the type of data from the subset of the target set of nodes;
   in response to the collected data satisfying the networking condition, performing, by the central networking system, a network operation on the node of the target set of nodes; and
   in response to the collected data not satisfying the networking condition, collecting the type of data from a second subset of the target set of nodes selected based on the sampling rule.

2. The method of claim 1, wherein the networking condition comprises:
   an above-threshold bandwidth used by the node of the target set of nodes,
   an above-threshold set of processing resources used by the node of the target set of nodes,
   one or more security conditions within the node of the target set of nodes, or
   one or more identified software components installed within the node of the target set of nodes.

3. The method of claim 1, wherein the sampling rule identifies a percentage of the target set of nodes to sample.

4. The method of claim 1, wherein the sampling rule specifies a method of randomly selecting the subset of the target set of nodes.

5. The method of claim 1, wherein selecting the subset of the target set of nodes based on the sampling rule comprises selecting:
   a threshold number of least utilized nodes,
   a threshold number of nodes using a lowest bandwidth, or
   a threshold number of nodes using a lowest amount of power.

6. The method of claim 1, wherein the network operation is selected such that, when then network operation is performed, the node of the target set of nodes no longer satisfies the networking condition.

7. A non-transitory computer-readable storage medium storing executable instructions that, when executed by a hardware processor of a central networking system, cause the central networking system to:
   access a network monitoring rule comprising 1) a networking condition, 2) a sampling rule, and 3) a type of data to be collected when a node of a target set of nodes of the network satisfies the networking condition;

receive a notification from an agent executing on the node of the target set of nodes;

detect that the node of the target set of nodes satisfies the networking condition based on the notification;

select a subset of the target set of nodes based on the sampling rule in response to the detection;

collect the type of data from the subset of the target set of nodes;

in response to the collected data satisfying the networking condition, perform a network operation on the node of the target set of nodes; and in response to the collected data not satisfying the networking condition, collect the type of data from a second subset of the target set of nodes selected based on the sampling rule.

8. The non-transitory computer-readable storage medium of claim 7, wherein the networking condition comprises:

an above-threshold bandwidth used by the node of the set of target nodes, an above-threshold set of processing resources used by the node of the set of target nodes, one or more security conditions within the node of the target set of nodes, or one or more identified software components installed within the node of the target set of nodes.

9. The non-transitory computer-readable storage medium of claim 7, wherein the sampling rule identifies a percentage of the target set of nodes to sample.

10. The non-transitory computer-readable storage medium of claim 7, wherein the sampling rule specifies a method of randomly selecting the subset of the target set of nodes.

11. The non-transitory computer-readable storage medium of claim 7, wherein selecting the subset of the target set of nodes based on the sampling rule comprises selecting:

a threshold number of least utilized nodes, a threshold number of nodes using a lowest bandwidth, or a threshold number of nodes using a lowest amount of power.

12. The non-transitory computer-readable storage medium of claim 7, wherein the network operation is selected such that, when the network operation is performed, the node of the target set of nodes no longer satisfies the networking condition.

13. A central networking system comprising a hardware processor and a non-transitory computer-readable storage medium storing executable instructions that, when executed by the hardware processor, cause the central networking system to:

access a network monitoring rule comprising 1) a networking condition, 2) a sampling rule, and 3) a type of data to be collected when a node of a set of target nodes of the network satisfies the networking condition;

receive a notification from an agent executing on the node of the target set of nodes;

detect that the node of the target set of nodes satisfies the networking condition based on the notification;

select a subset of the target set of nodes based on the sampling rule in response to the detection;

collect the type of data from the subset of the target set of nodes;

in response to the collected data satisfying the networking condition, perform a network operation on the node of the target set of nodes; and in response to the collected data not satisfying the networking condition, collect the type of data from a second subset of the target set of nodes selected based on the sampling rule.

14. The system of claim 13, wherein the networking condition comprises:

an above-threshold bandwidth used by the node of the target set of nodes, an above-threshold set of processing resources used by the node of the target set of nodes, one or more security conditions within the node of the target set of nodes, or one or more identified software components installed within the node of the target set of nodes.

15. The system of claim 13, wherein the sampling rule identifies a percentage of the target set of nodes to sample.

16. The system of claim 13, wherein the sampling rule specifies a method of randomly selecting the subset of the target set of nodes.

17. The system of claim 13, wherein selecting the subset of the target set of nodes based on the sampling rule comprises selecting:

a threshold number of least utilized nodes, a threshold number of nodes using a lowest bandwidth, or a threshold number of nodes using a lowest amount of power.

* * * * *